US 6,707,497 B1

(12) United States Patent
Pantigny et al.

(10) Patent No.: US 6,707,497 B1
(45) Date of Patent: Mar. 16, 2004

(54) METHOD OF BIASING THE PHOTODIODES OF A MATRIX SENSOR THROUGH ASSOCIATED PIXELS THEREOF

(75) Inventors: Philippe Pantigny, Claix (FR); Jean-Luc Martin, St Geoire en Valdaine (FR); Régis Hamelin, Lyons (FR); Sylvain Paltrier, Voreppe (FR)

(73) Assignee: Commissariat a l'Energie Atomique, Paris (FR)

( * ) Notice: Subject to any disclaimer, the term of this patent is extended or adjusted under 35 U.S.C. 154(b) by 768 days.

(21) Appl. No.: 09/584,848

(22) Filed: Jun. 1, 2000

(30) Foreign Application Priority Data

Jun. 15, 1999 (FR) ............................................. 99 07540

(51) Int. Cl.⁷ ............................................. H04N 5/335
(52) U.S. Cl. .................... 348/310; 348/309; 250/214 R
(58) Field of Search ..................... 348/309, 310; 250/214.1, 214 R, 208.1

(56) References Cited

U.S. PATENT DOCUMENTS 4,764,682 A * 8/1988 Swartz ........................ 348/310
5,168,338 A 12/1992 Kumada et al.
5,578,815 A * 11/1996 Nakase et al. .......... 250/214 R

FOREIGN PATENT DOCUMENTS

| EP | 62069671 | 3/1987 |
| EP | 0670656 | 9/1995 |
| FR | 2736782 | 4/1995 |

OTHER PUBLICATIONS

J.L. Tissot, F. Bertrand "Le Developpment Des Technologies Infrarouges Futures Au Lir," *Colloque International Optronique & Defense* 3–5 Décembre 1996, Montigny le Bretonneux France.

Hon–Sum Wong, "Technology and Device Scaling Considerations for CMOS Imagers"—*IEEE Transactions on Electron Devices*, vol. 43. No. 12, Dec. 1996.

* cited by examiner

*Primary Examiner*—Andrew Christensen
*Assistant Examiner*—Dorothy Wu
(74) *Attorney, Agent, or Firm*—Thelen Reid & Priest LLP

(57) ABSTRACT

An image sensor comprises a detector circuit (17) with detector diodes (3), which are reverse biased during image sensing. It is characterized in that the cathode voltage of the detector diodes is controlled by forward biasing detector circuit (17) diodes via the read circuit (20). The control diodes can be dedicated diodes or forward biased photodetector diodes. In the latter case, a picture is taken in several sequences.

7 Claims, 13 Drawing Sheets

METHOD OF BIASING THE PHOTODIODES OF A MATRIX SENSOR THROUGH ASSOCIATED PIXELS THEREOF

TECHNICAL FIELD OF THE INVENTION

This invention relates to the field of electromagnetic radiation, in particular visible or infrared radiation, detector networks. The field is limited more particularly to image sensors (ref. [1], [2] of the appended list) composed of a detector circuit interconnected to a read circuit. It relates to a device and method of biasing such photodetectors.

TECHNOLOGICAL BACKGROUND

Overview of Photodetection

A photodiode is a semiconductor device, which, when illuminated by sufficient energy radiation, outputs a photocurrent by generating electron-hole pairs. Two categories of photodiodes can be produced, according to the type of junction and substrate doping, the N-type junction on P-type semiconductor material and its equivalent, a P junction on N material.

Only the case of N photodiodes on P will be discussed hereafter. All the principles that will be presented are easily transposed to type-P photodiodes on N substrate by a person skilled in the art.

The detector circuit is generally formed of an arrangement of elementary photodiodes implanted with regular spacing according to a matrix of m lines by n columns wherein all junctions are coplanar. Each photodiode is coupled to a preamplifier implanted on the read circuit providing the conversion of the photocurrent output by the detector into a physical quantity compatible with analog processing systems achievable in integrated circuits (current, load, or voltage). The functions implanted on the read circuit also enable multiplexing the information output by each photodiode to a limited number of video outputs. The information output by each photodiode and conditioned by the read circuit analog system corresponds to a picture element or pixel.

The detector circuit can be illuminated either on the side where junctions are made or on the opposite side. The detector circuit is interconnected to the read circuit by means of an adequate method, e.g. microspheres in the case of sensors made by means of a hybrid detector circuit reversed on a read circuit (ref. [3]).

E.g., the principle of photovoltaic detection enables the production of image sensors operating in the visible region spectrum band, or the infrared one (thermal imaging). Spectrum band selectivity is obtained by producing photodiode junctions on a semiconductor material the forbidden bandwidth of which fits the wavelength to be detected.

State-of-the-art of Photodiode Biasing

The invention relates to the method used for biasing the photodiodes of the detector circuit. Hereafter, the review of the state-of-the-art will focus on the issue of biasing photodiodes of such sensors.

First of all, the operating principle of the sensor will be recalled, then the impact of the material, whereon the detector circuit is produced, on controllability—i.e. the capacity of imposing a level, here to apply a voltage source—photodiode electric nodes.

Sensor Operating Principle

On the one hand, FIG. 1a represents a look-through cross-section of a junction between a P-type semiconductor substrate 1 and an N-type area 2 producing an N/P junction. The symbolic representation is composed of the symbolic representation of a diode 3, the anode 4 of which is located above cathode 5, so as to show that it is the substrate that is P-type.

FIG. 1b represents the same elements, however, this time, it is substrate 1 that is N-type. A P-type area 2' is implanted on this substrate 1' producing a P/N junction. Symbolically, this junction is represented by a diode 3', the anode 4' of which is located above cathode 5', so, as to show that it is substrate 1' that is N-type.

The current-voltage characteristic of such a junction is represented in FIG. 2. On curve (a), the non-linear characteristic of the ideal junction with zero illumination can be seen: low dynamic impedance when the diode is forward biased, with anode voltage being greater than cathode voltage, and on the contrary, high dynamic impedance when the photodiode is reverse biased with an anode voltage less than the cathode voltage. When the photodiode is illuminated, the current-voltage characteristic, represented by curve (b) is translated vertically by an amount $I_p$ equal to the photocurrent generated by the photodiode. It should be noted that conventionally, the photodiode current-voltage characteristics are represented in conventional quadrants and not with the actual current and voltage signs.

The schematic diagram of a sensor is represented in FIG. 3, it corresponds to the cross-section of a matrix sensor, normal to the layer planes, following one of the directions of the lines and columns of the sensor matrix.

This diagram illustrates the case of a hybrid detector circuit 17, reversed on a read circuit 20 as mentioned, e.g., in document [2]. The N photodiodes of the row corresponding to the cross-sectional plane are marked $D_1$ to $D_N$, their anodes $A_1$ to $A_N$ and their cathodes $K_1$ to $K_N$. The photodiode anodes of detector circuit 17 are connected to the inputs $E_1 \ldots E_N$ of read circuit 20. Continuity between detector 17 and read 20 circuits is provided by a vertical connection, e.g. of the indium microsphere type 21.

The read circuit preamplifiers 20 are numbered from $PA_1$ to $PA_N$.

The imaging process of this pixel row is the following one:

1. biasing the photodiode during image sensing so that it delivers a photocurrent;
2. processing the current output by the photodiode by means of preamplifiers;
3. multiplexing the output signal of each preamplifier to a video output.

The process is repeated at frame rate.

In practice, each photodiode is biased in the reverse part of its characteristic, at a voltage where the intensity of its current with zero illumination is relatively low in comparison with its photocurrent intensity. Controlling the difference of potential between the anode and cathode of each photodiode is therefore decisive for the operation of the detector circuit.

Controlling the potential of each anode is provided by the preamplifier input (e.g., virtual ground of a differential amplifier). On the other hand, the cathodes of each photodiode cannot be controlled individually. In fact, they are short-circuited by the semiconductor material where the junctions are made. Therefore, the cathodes $K_1$ to $K_N$ can only be controlled indirectly, via a single electric node of the detector circuit identified as $K_C$—for common cathode.

Impact of the Detector Circuit Substrata

The electric characteristics of the layers composing the slice whereon the detector circuit is produced will determine the resistor for accessing the cathode of each photodiode. A schematic cross-section of these slices is represented in FIG. 4. We can distinguish between three categories of slices:

1. the so-called solid substrate ones, represented in FIG. 4-A;

2. the so-called epitaxial substrate ones, represented in FIG. 4-B;

3. the so-called insulating substrate ones, represented in FIG. 4-C.

The solid substrate of FIG. 4-A is composed of a single layer 4 for the whole slice thickness. Slice resistivity $\rho_1$ is uniform and suitable for realizing high-performance photodetector junctions.

The epitaxial substrate, FIG. 4-B, is a dual layer one 7, 8. The photodiode junctions are made in the upper layer 7 of reduced thickness and resistivity $\rho_2$ suitable for producing photodiodes. The bottom layer 8 is made of the same material. It is very thick and its resistivity $\rho_3$ is very low, for minimizing the resistor accessing the junction cathodes.

The top layer 9 of an insulating substrate 10, FIG. 4-C, has thickness and resistivity characteristics that are close to that of the epitaxial substrate. The base 10 thereof is also very thick. It can be produced by stacking up various materials, but at any rate, it acts as an electric insulator.

The detector circuits operating in the visible spectral range are produced on solid or epitaxial, or even insulating (ref. [1]) silicon substrates. Those operating in the infrared spectral range are rather produced on insulating substrates (e.g. the HgCdTe semiconductor material on a CdZnTe insulator of ref. [2]). At any rate, photodiodes are coplanar.

Controllability of Cathode Potential

Control Via the Opposite Side of the Junctions

The common cathode of the photodiodes of detector circuits 17 made on the solid or epitaxial substrates can obviously be controlled by providing electric continuity between a voltage source 11 and a contact 12 made on the opposite side 13 of the detector circuit junctions 1, 2. However, this solution represented in FIG. 5 is not always applicable.

First of all, the technological manufacturing method must incorporate additional steps for producing the ohmic contact 12 on the opposite side 13 of the junctions 1, 2.

Next, for sensors illuminated through substrate side 13, the loss of light flow at the ohmic contact 12 of substrate side 13, or even its attenuation throughout the passage can turn out to be prohibitive.

Finally, applying a voltage source to the opposite side 13 of the junctions (1, 2) can be done by means of a soldered conductive wire 14, also represented in FIG. 5, but the following is required:

the circuit supports the mechanical and thermal constraints induced by the interconnection method employed, the detector circuit is surrounded by an area the dimensions of which are compatible with this method—no deterioration of the electro-optical characteristics of the photodiodes located nearby, no wire shadows on the optically sensitive area.

Due to these reasons, the controllability of the common cathode is often provided for detector circuits produced on solid and epitaxial substrates by using the technique that has to be implemented for insulating substrates and which will be described hereafter with reference to FIG. 6.

Control Via Junction Side

In this case, the detector circuit manufacturing method incorporates technological steps allowing to produce, in addition to N-type junctions 1, 2 on the P-type semiconductor material, an ohmic contact 12 on this material.

A schematic cross-section of such a detector circuit 17 is represented in FIG. 6. The $N^+$ areas 2 stand for the photodiode anodes. The $P^{++}$ area stands for the ohmic contact 12 on the type-P material.

At the sensor level, electric continuity between the ohmic contact 12 of the common cathode and its power supply is provided via the read circuit, the interconnection between the ohmic contact 12 made on the detector circuit 17, and the read circuit is provided by the same interconnection method as that used for linking each anode to its preamplifier, e.g. an indium microsphere 21.

As can be seen, this technique of biasing the common cathode via the side 15 containing junctions is applicable to the circuits produced on the 3 substrate categories.

In addition to the fact that it avoids a connectivity operation on substrate side 13, this method releases the opposite side 13 of the junctions from any electric constraint related to the common cathode. Thus it is possible to optimize the optical response of the circuits illuminated through their substrate, e.g. by removing all or part of the substrate base.

Summary

Whatever the nature of the substrate used for manufacturing detector circuit 17, controlling the potential of the common photodiode cathode by means of an ohmic contact 12 on the semiconductor material, produced on the side 15 containing the coplanar junctions of the detector circuit turns out to be a good compromise between:

the difficulties of manufacturing the detector circuit 17 the sensor's electro-optical performance the constraints of assembly in boxes.

However, this control method has some disadvantages that will be approached below.

CRITICISM OF THE ART

Photodiode Serial Resistance

As is the case with most detector circuits, we will assume that the ohmic contact 12 of the common cathode is implanted at the periphery of the area occupied by the photodiodes.

Equivalent Electric Diagram

The electric diagram of FIG. 3 must be modified as indicated in FIG. 7 to take into account the phenomena induced by the finite resistivity value of the semiconductor material whereon junctions are produced:

the inter-cathode resistor ($R_{IK}$) reflects the equivalent electric resistance between the cathode of a photodiode and that of the one associated therewith, the resistor for accessing the common cathode electric node ($R_{AKC}$) represents the electric resistance of the area separating cathode $K_N$ from the ohmic contact 12 of the common cathode $K_C$.

Each photodiode behaves like a current generator $IA_{K1} \ldots IA_{KN}$. The current generated for each photodiode crosses resistors $R_{IK}$ separating the photodiode from resistor $R_{AKC}$ and resistor $R_{AKC}$ itself so that it is crossed-by the sum of photodiode currents.

This one-dimensional diagram is sufficient for demonstration purposes. Generalizing it to a two-dimensional detector circuit results in a two-dimensional array of inter-cathode electric resistors, each photodiode being associated with the photodiodes implanted on its four sides and with the resistors for accessing the common cathode, which vary depending on how the $P^{++}$ areas are distributed over the photodiode periphery on one side, two adjacent sides, two parallel sides or else on the four sides of the photodiode matrix.

Such a photodiode matrix is schematically represented in FIG. 8 and will be described hereafter. This matrix 16 has a set of junctions 1, 2 arranged in a matrix. A $P^{++}$ contact 12 composing a closed line surrounds the matrix set 16 of junctions 1, 2. The limits 30 of detector circuit 17 are represented by a closed dotted line 30.

Space Variation of Effective Biasing

Around its operating point, each photodiode $D_n$ can be considered equivalent to a current generator with a value $I_{AKN}$, as explained above with reference to FIG. 7. Such a representation is the object of FIG. 9.

The electric diagram of FIG. 9 clearly highlights that the currents output by the photodiodes are summed as the electric node $K_C$ is approached. The current flow in resistors $R_{IK}$ causes a potential drop that increased when moving away from node $K_C$. Therefore, the potential of each cathode KN is not equal to the voltage applied to the node of the common cathode $K_C$.

This biasing technique introduces a space variation of the voltage applied to the photodiode cathode: all other conditions being the same, the photodiodes are not biased with the same potential difference between anode and cathode.

From a certain threshold on, the space variation of the photodiode operating point has the effect of reducing sensor performance because the optimal biasing range is reduced thereby.

The depolarization space variation amplitude is all the greater since the number of sides whereon the $P^{++}$ ohmic contact 12 can be implanted is reduced.

Response to Localized Overillumination

The response to localized overillumination in space is a decisive criterion for an image sensor. Ideally, the photodiode response of the overilluminated area must not modify the response of the photodiodes located outside of this area.

Given the electric diagram of FIG. 9, it is clear that the overillumination of a photodiode located in the middle of the detector-circuit will cause a high current to flow through resistors $R_{IK}$ and $R_{AKC}$ that are separating it from electric node $K_C$. The potential drop induced by this current flow will modify the cathode potential of the photodiodes located upstream and downstream of the overilluminated photodiode. As they are no longer biased at the same operating point, these photodiodes will output a different intensity current if their dynamic resistance is not infinite, while the illumination they are receiving has not changed.

With this method of biasing photodiode cathodes, the electro-optical response of the overilluminated photodiodes introduces a variation in the electro-optical response of all or part of the other photodiodes of the detector circuit while their illumination has not varied. This phenomenon can for instance cause false alarms.

Detector Circuit Size

Producing a $P^{++}$ contact near a $N^+$ photodiode must comply with a set of design rules. In practice, it is not possible to design such a contact between the photodiodes of a detector circuit the photodiodes of which are designed with reduced spacing.

This difficulty could be obviated by replacing one or several photodiodes with a $P^{++}$ contact. However, this would have the effect of increasing the number of the sensor's blind pixels.

Therefore, the $P^{++}$ contact 12 of the common cathode is generally implanted on the periphery of the detector circuit, as represented in FIG. 8. The overall size of the detector circuit 17 is thus significantly increased with respect to the dimensions of the sensitive area 16 occupied by the photodiode matrix.

This is due to the fact that on the one hand, a $P^{++}$ ohmic contact 12 is normally designed in ring-shape around the photodiode matrix 16 in order to minimize the space variations of the photodiode series resistance, and on the other hand, that it is necessary to keep a minimum distance between the $P^{++}$ ohmic contact 12 and the $N^+$ areas of the photodiode junctions (2, 1).

Therefore, this method does not allow to maximize the filling factor of the detector circuit 17 with its photodiodes, which translates into material loss for a given number of pixels, or else a decrease of the number of pixels for a given detector circuit size 17.

Detector Circuit Manufacturing Method

Although it is incorporated in most detector circuit manufacturing methods, producing a $P^{++}$ ohmic contact 12 does not go without problems.

First of all, it significantly increases the number of manufacturing steps'. Indeed, it is necessary to produce $P^{++}$-type areas, then to pick up ohmic contacts in these areas.

Furthermore, the technological methods implemented for producing ohmic contacts and interconnections must be compatible both with $P^{++}$ areas and with $N^+$ areas. The choice of the technological methods is therefore more limited than in the case where it is only necessary to provide electric continuity with $N^+$ areas.

In conclusion, the necessity of producing the ohmic contact required for biasing the common cathode results in a more complex manufacturing method than that required for mere photodiode production.

BRIEF DESCRIPTION OF THE INVENTION

The invention eliminates the need to keep the ohmic contact 12. Thus, a set of coplanar photodetectors can be obtained, together composing an image sensor circuit, each photodetector composing in general one image pixel, wherein the value of the signal output by one of the photodetectors is not modified or not much modified by the value of the signal output by other photodetectors of the sensor. It aims at obtaining a detector circuit with greater density per unit area, i.e. with a greater number of photodetectors per unit area of a detector circuit. Finally, it aims at simplifying the manufacturing of a detector circuit.

For all these purposes, the invention relates to an image sensor comprising:
- a detector circuit composed of a first set of coplanar photodiodes carried by a substrate, each photodiode having an anode and a cathode,
- a read circuit composed of a set of elementary read means, with the detector circuit and the read circuit being interconnected so that each elementary read means is coupled to the anode of a photodiode, a means for biasing photodiodes by creating a potential difference between each photodiode anode and cathode, the image sensor being characterized in that the substrate of the detector circuit has a second set of diodes that are coplanar and located in the same plane as that of the first set, each diode of the second set having a cathode and an anode, each diode of the second set being associated with at least one photodiode of the first set, each anode of the diodes of the second set being connected or can be connected through the read circuit to a first voltage source ($V_{apol}$) reverse biasing the diodes of the first set, and in that each anode of the diodes of the second set is connected or can be connected through the read circuit to a second voltage source ($V_{kpol}$) forward biasing the diodes of the second set, with the voltage for biasing the photodiodes of the first set thus being controlled by controlling the voltages applied to the anodes of the first and second set.

Voltage $V_{apol}$, which is applied to the anodes of the photodiodes or detector diodes for biasing them, is the detector voltage. Voltage $V_{kpol}$, which is applied to the anodes of the diodes of the second set or the control diodes for biasing them, is the control voltage. The control voltage applied to an anode of a control diode forces a potential onto the cathode of the neighboring diodes.

Thus, it appears that due to this way of controlling the cathode of the detection biased diodes or junctions of a detector circuit, the impedance between a cathode of a detection biased junction and the cathodes nearest to the control diodes is essentially the same.

It should be noted that so far, it has been considered implicitly:

1. that the substrate has omnidirectional homogeneity,
2. that when there are several cathode voltage application points neighboring a photodetector diode, the photodetector current of this diode is distributed in parallel among the photodiode and these various points.

The result is that the influence of one diode or a group of neighboring detector diodes blinding each other is limited to one portion of the detector delimited by a line joining the reference voltage application points that are closest to the junctions located at the limit of the detector's blinded portion.

It will be possible to perform reference voltage application through conductor feedthroughs of the read circuit, directly applied to the detector circuit via forward biased detector circuit junctions in order to obtain low junction impedances. These diodes can be diodes solely dedicated to biasing.

It will appear below that, in the preferred embodiment, the detector circuit photodetector diodes are used for applying the reference voltage, which are immediately neighboring detection biased diodes.

Thus, the potential of the cathode of a detector circuit photodiode is controlled by means of photodiodes associated therewith. For this purpose, associated photodiodes just have to be biased for their forward characteristic, at the point where they have very low dynamic resistance. Potential transmission is provided through the read circuit, contact between the read circuit and the photodiode being provided by a known means.

The invention also relates to a method of biasing photodiodes of an image sensor detector circuit, the detector circuit having, on the same substrate, two sets of coplanar diodes, a first one comprising coplanar photodiodes and a second one comprising coplanar control diodes, each diode of each of the sets having an anode and a cathode, and one control diode being associated with at least one photodiode, the method being characterized in that a voltage reverse biasing the diodes of the first set is applied to the anodes of the first set diodes, and in that a voltage forward biasing said diodes of the second set is applied to the anodes of the second set diodes.

BRIEF DESCRIPTION OF THE DRAWINGS

FIGS. 1, 2, 3, 4 are figures for information applicable both to prior art and this invention.

FIGS. 5, 6, 7, 8, 9, are figures illustrating or explaining aspects of prior art.

FIGS. 1 to 9 have already been described.

FIGS. 10 to 20 illustrate aspects and explanations related to this invention.

In FIGS. 1 to 20, elements having identical functions have the same reference number.

DESCRIPTION OF SAMPLE EMBODIMENTS

As it has been seen above, the invention consists in imposing, by control diode anode voltage control, the cathode voltage of each photodiode so as to equalize the apparent impedance of each photodiode among them.

Advantageously, on the detector circuit, diodes will be implanted that can be forward biased and one electrode of which will be permanently coupled to a constant voltage source through the read circuit.

Figure 10:
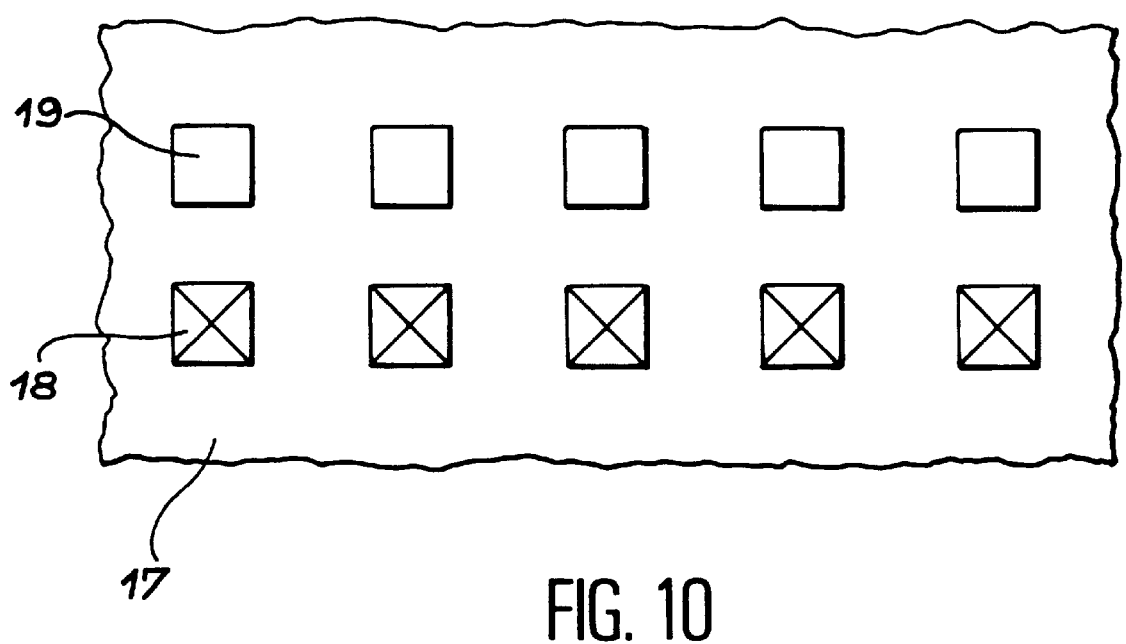
FIGS. 10 and 11 show sample control diode implantations on the same substrate.
Figure 11:
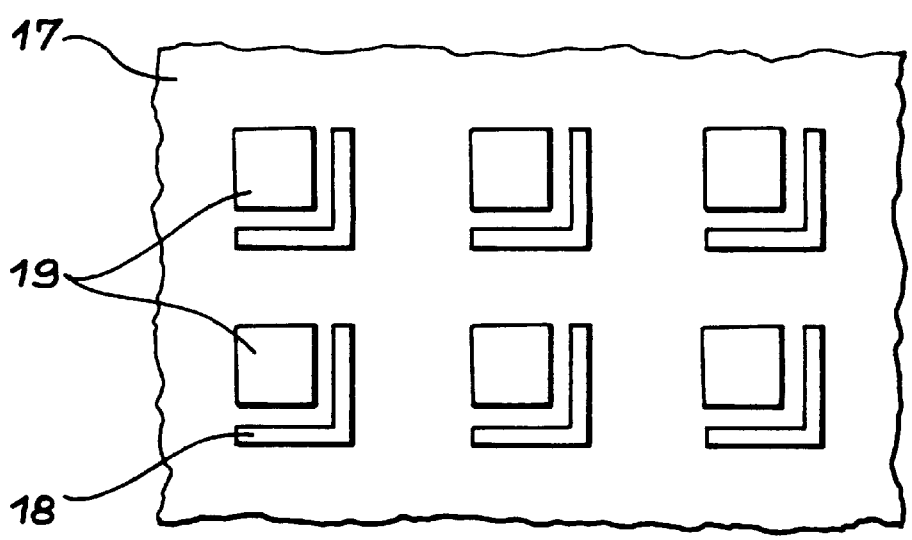

Geometrical implantation modes of such diodes are represented in FIGS. 10 and 11.

FIG. 10 represents the case of a linear strip of photodetectors where all the space required for implanting control diodes is available.

In this case, control diodes 18 can be aligned on a line parallel to the photodiode 19 implantation line. In the example represented in FIG. 10, each control diode 18 is located in alignment with a photodiode 19.

Figure 17:
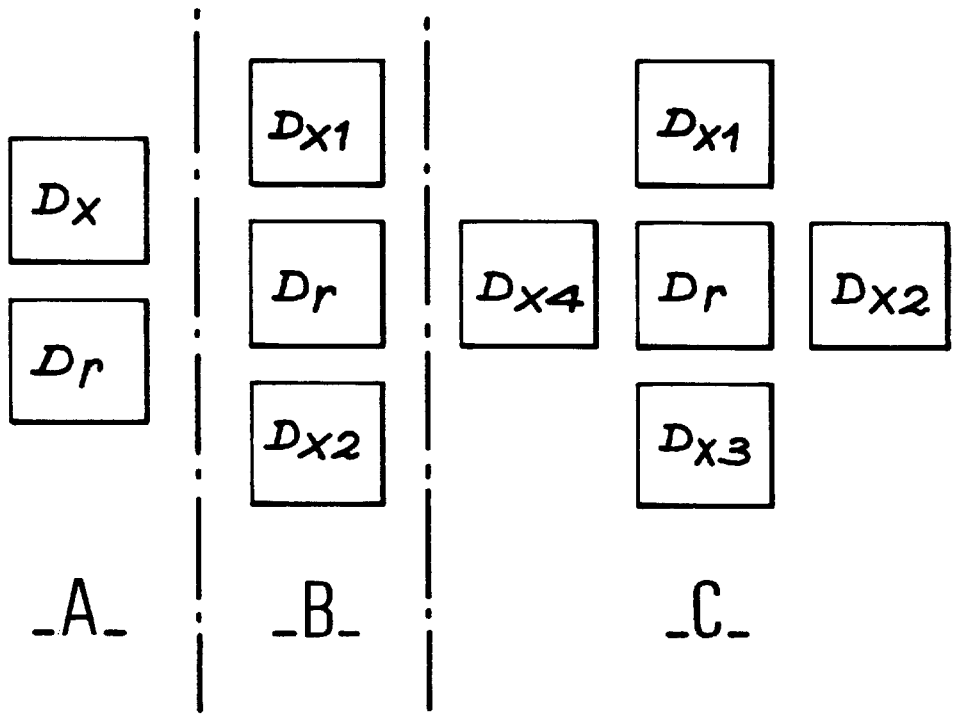
FIG. 17 represents sample utilizations of various associated diodes for biasing a photodiode, it comprises parts A, B, C.

In this case, it is also possible to provide two lines of control diodes located on either side of the photodiode line as represented in FIG. 17 part B, and in this case, each photodiode is located in alignment with two control diodes. FIG. 17 will be described below.

In the case of an array schematically represented in FIG. 11, the space occupied by the control diodes is necessarily so to the detriment of the density per unit area of the photodiodes. Therefore, in this implantation mode, it will be interesting to give control diodes 18 a shape based on narrow lines; e.g., at right angles. It is such a sample embodiment that is represented in FIG. 11 where each square-shaped photodiode 19 is surrounded on two of the diode sides by the two branches of the set square formed by control diode 18.

In the examples represented in FIGS. 10 and 11, the control diode can be a forward biased photodiode in order to obtain low dynamic resistance, or a dedicated diode.

In the preferred embodiment that will be described now, the control diodes and photodiodes are all photodiodes. These photodiodes will be forward or reverse biased in turn to operate as a photodiode or control diode.

Figure 12:
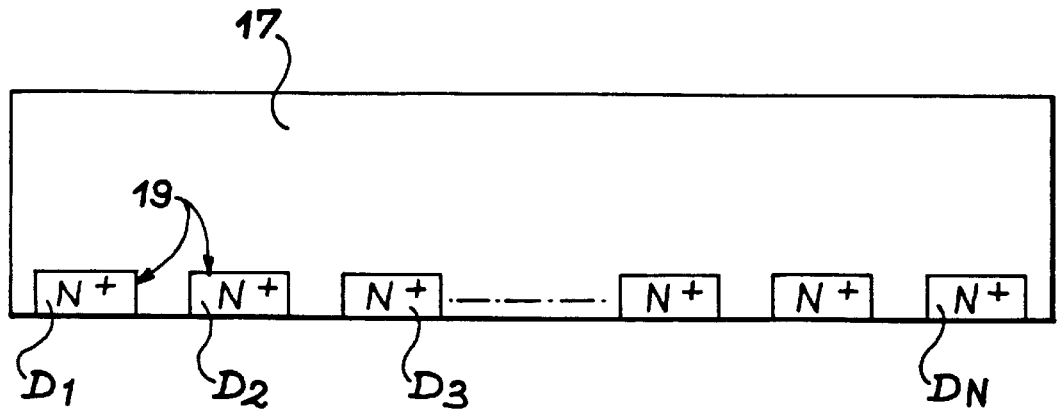
FIG. 12 shows a look-through cross-section, along a line of junctions implanted on a solid, epitaxial or insulating substrate.

A technological schematic cross-section of the detector circuit is represented in FIG. 12. Photodiodes 19 are realized by $N^+$ junctions on a P-type and resistivity $\rho_{SC}$ semiconductor material 1. The substrate can be solid, epitaxial or insulating and all photodiodes are coplanar.

Figure 1:
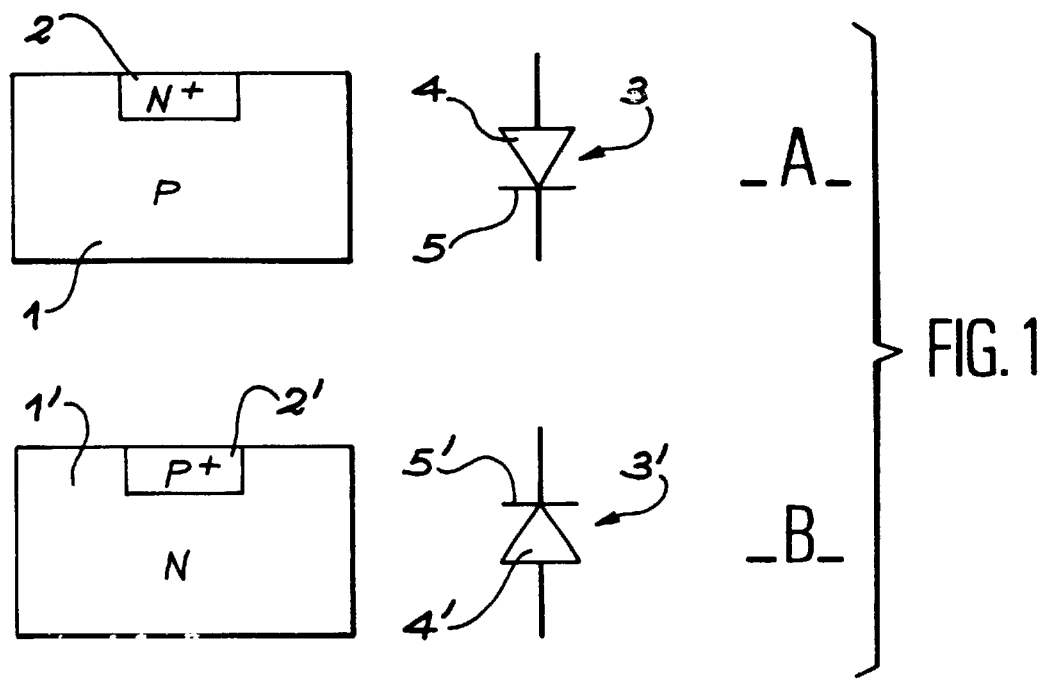
FIG. 1 comprising parts A and B, represents the hardware realization of an N/P junction (part A) and a P/N junction (part B), as well as their symbolic representations.
Figure 2:
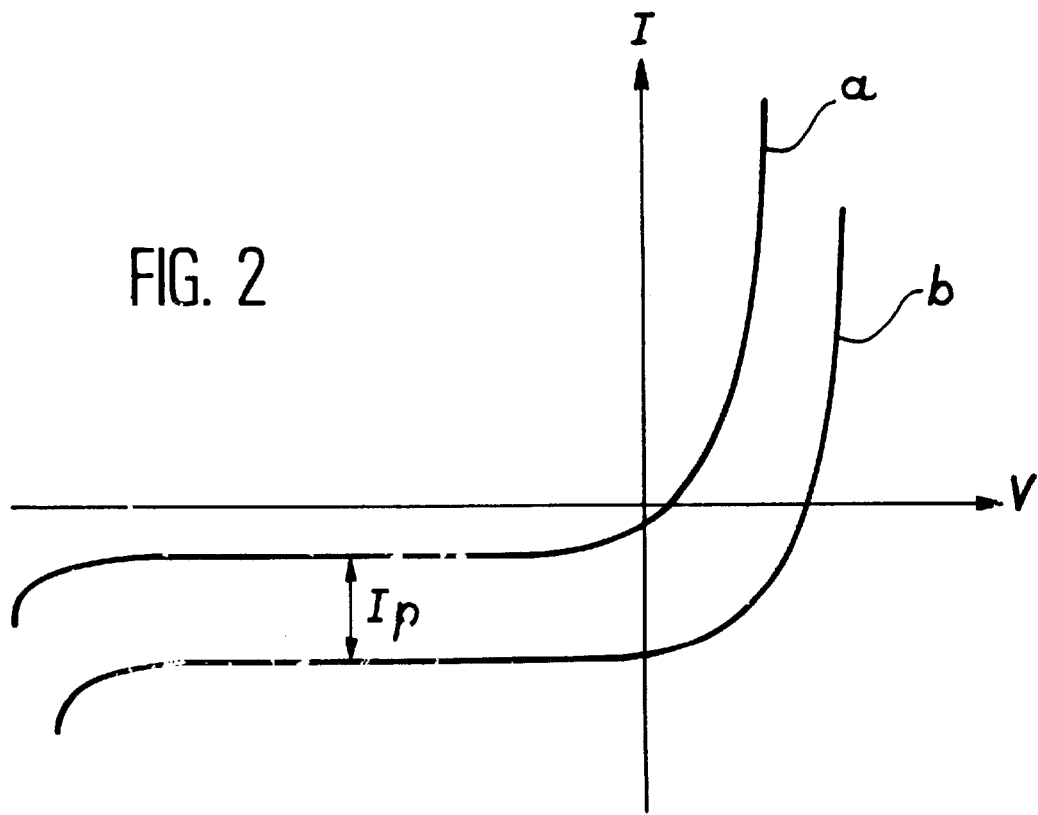
FIG. 2 represents the current-voltage curves of a photodiode with zero or almost zero illumination, and with non-zero illumination, respectively.
Figure 3:
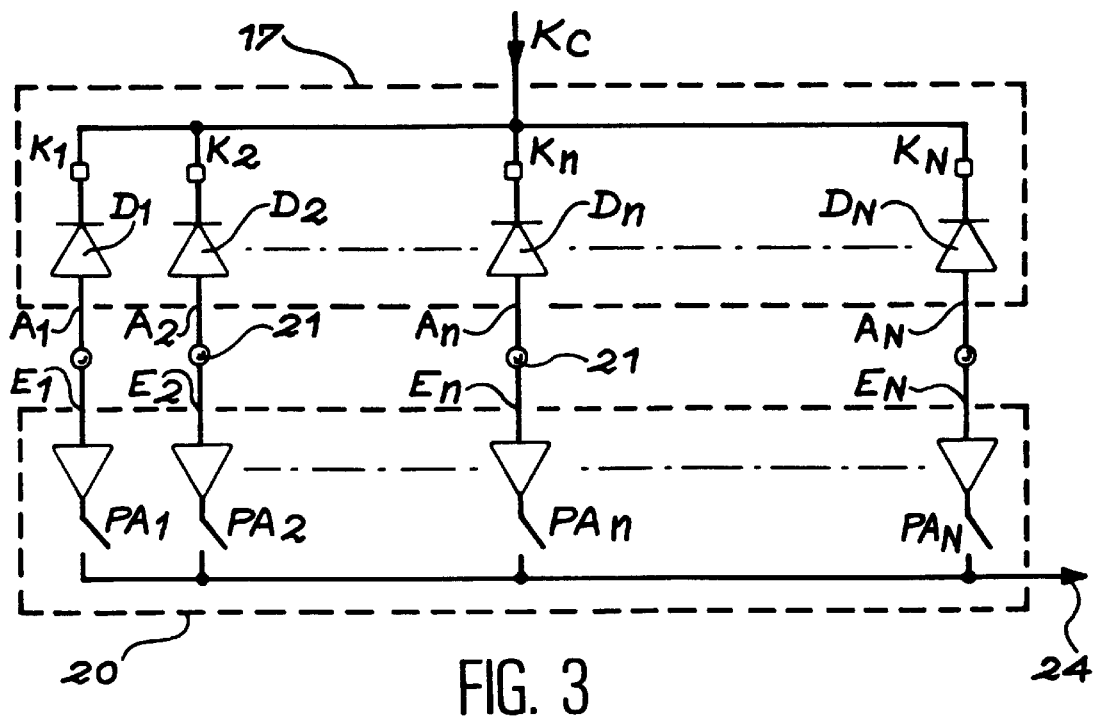
FIG. 3 is an electronic diagram of a photodiode image sensor section.
Figure 4:
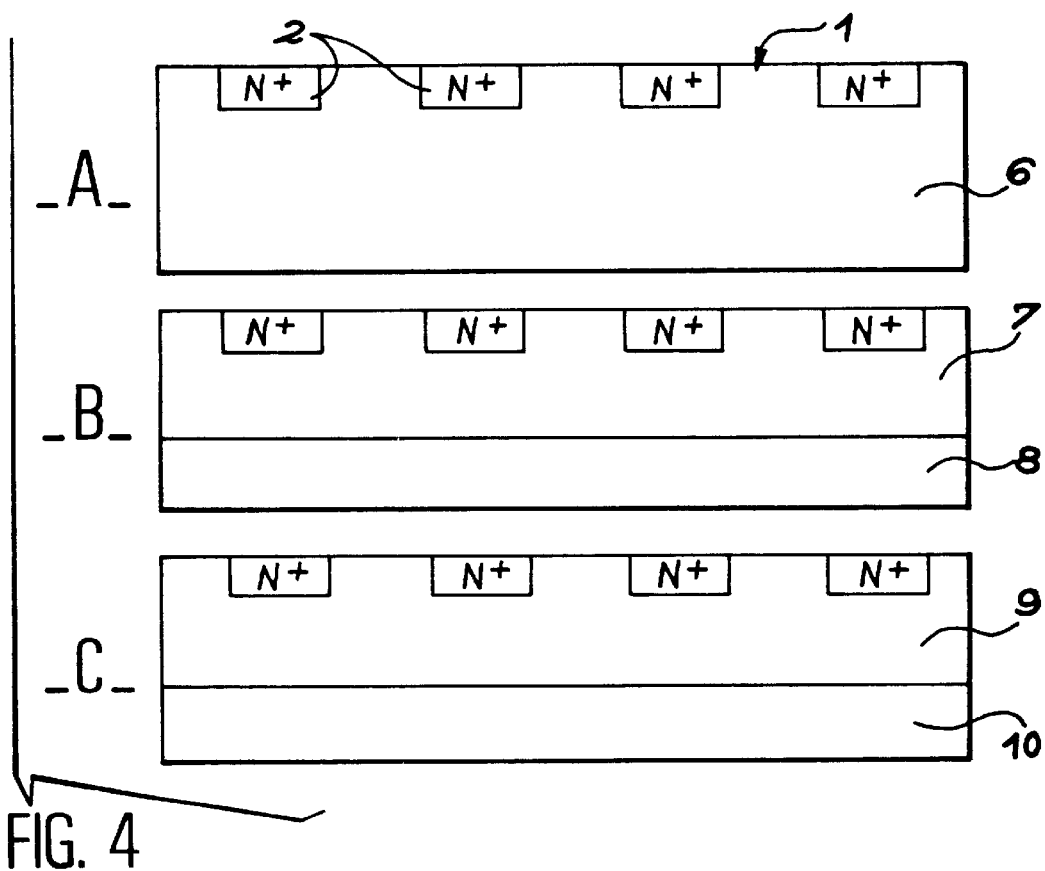
FIG. 4 illustrates the three substrate categories that can be found. It comprises parts A, B, C.
Figure 5:
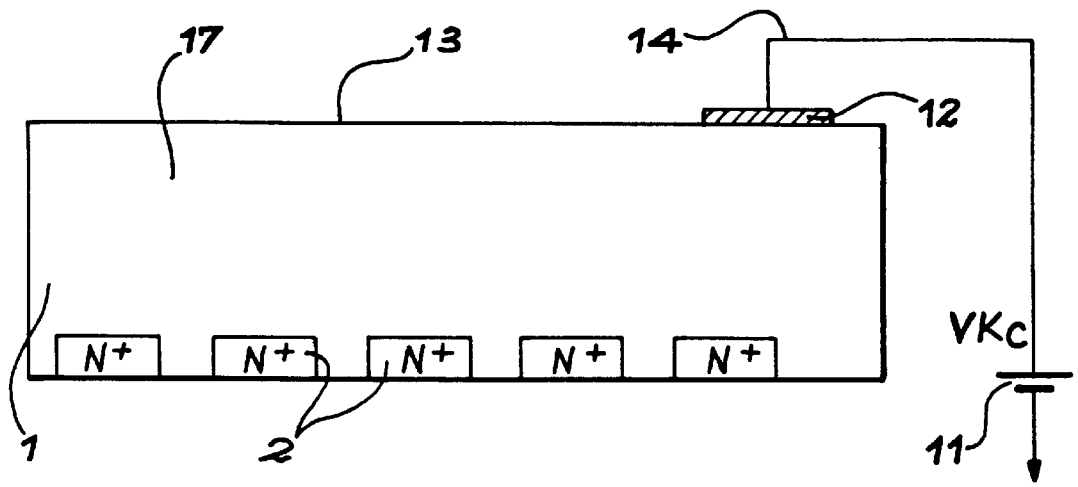
FIGS. 5 and 6 illustrate the mode of controlling a common cathode according to the substrate type.
Figure 6:
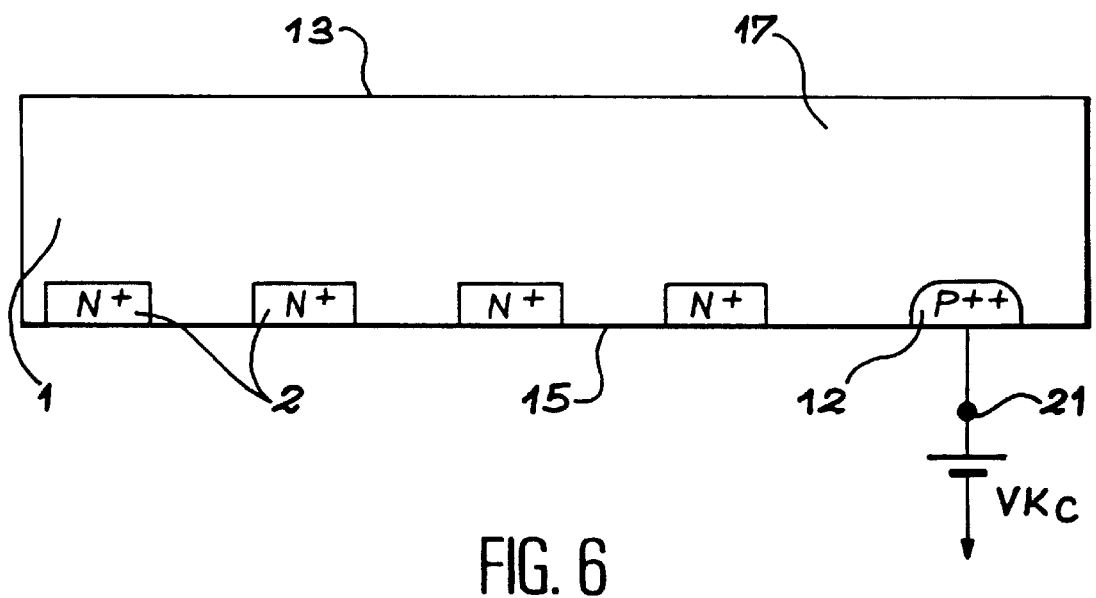
Figure 7:
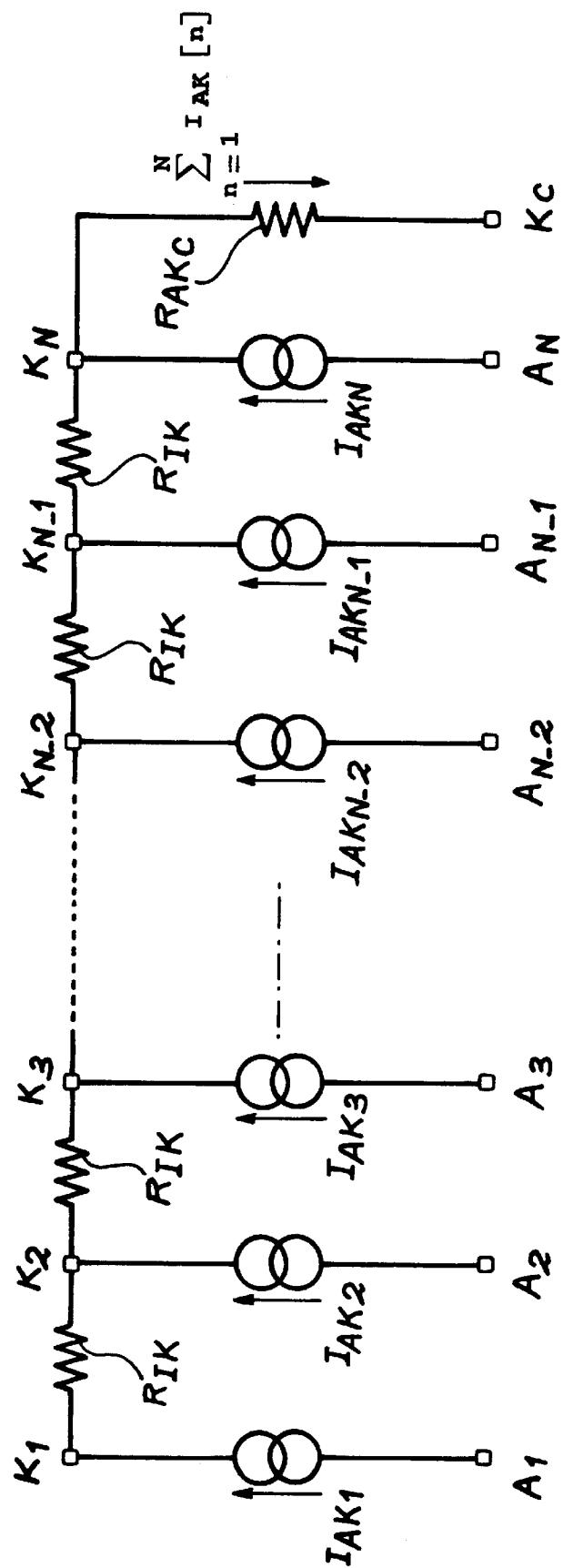
FIG. 7 is an equivalent electric diagram of a detector circuit.
Figure 8:
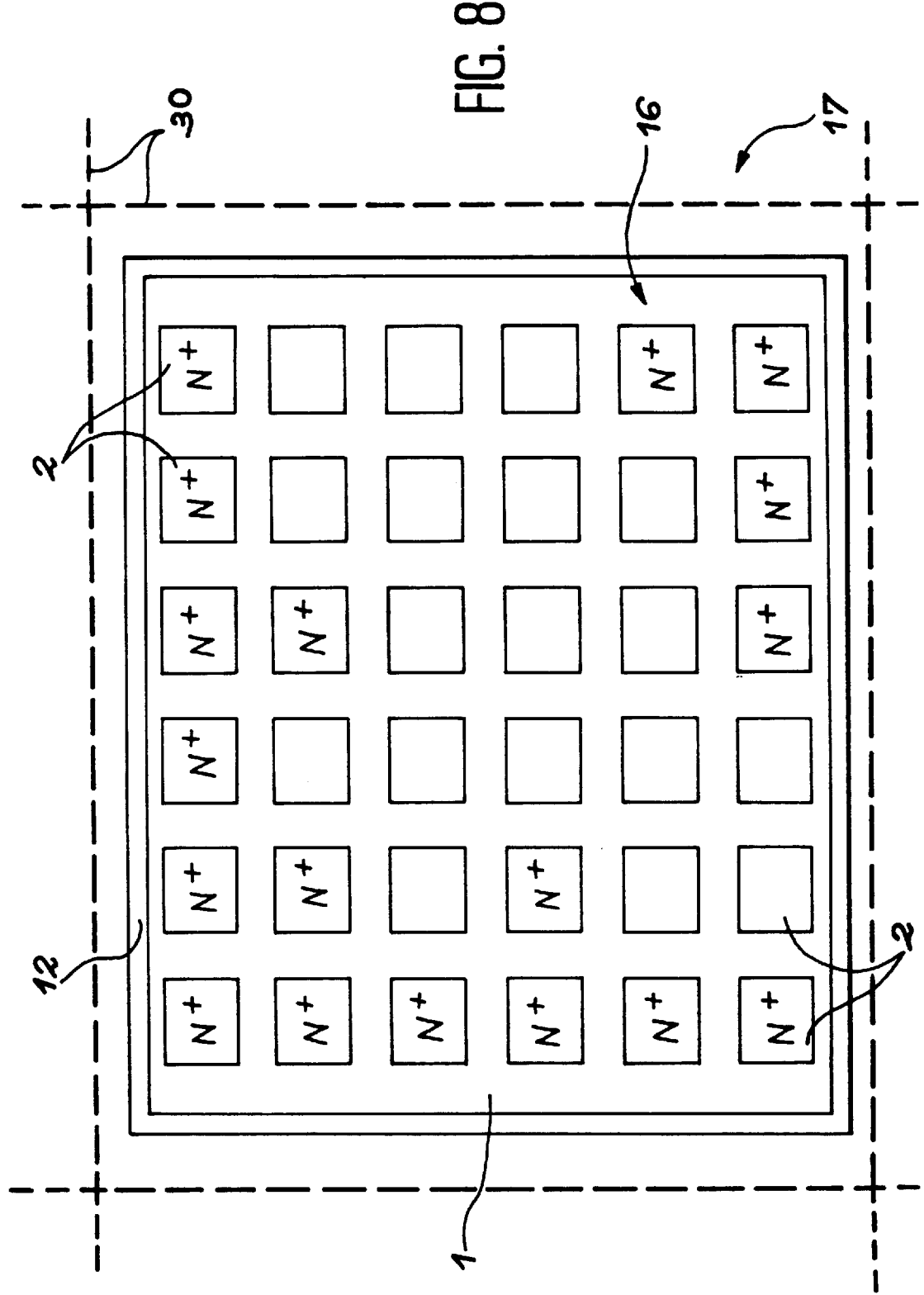
FIG. 8 is a schematic diagram showing the photodetector diode implantation.
Figure 9:
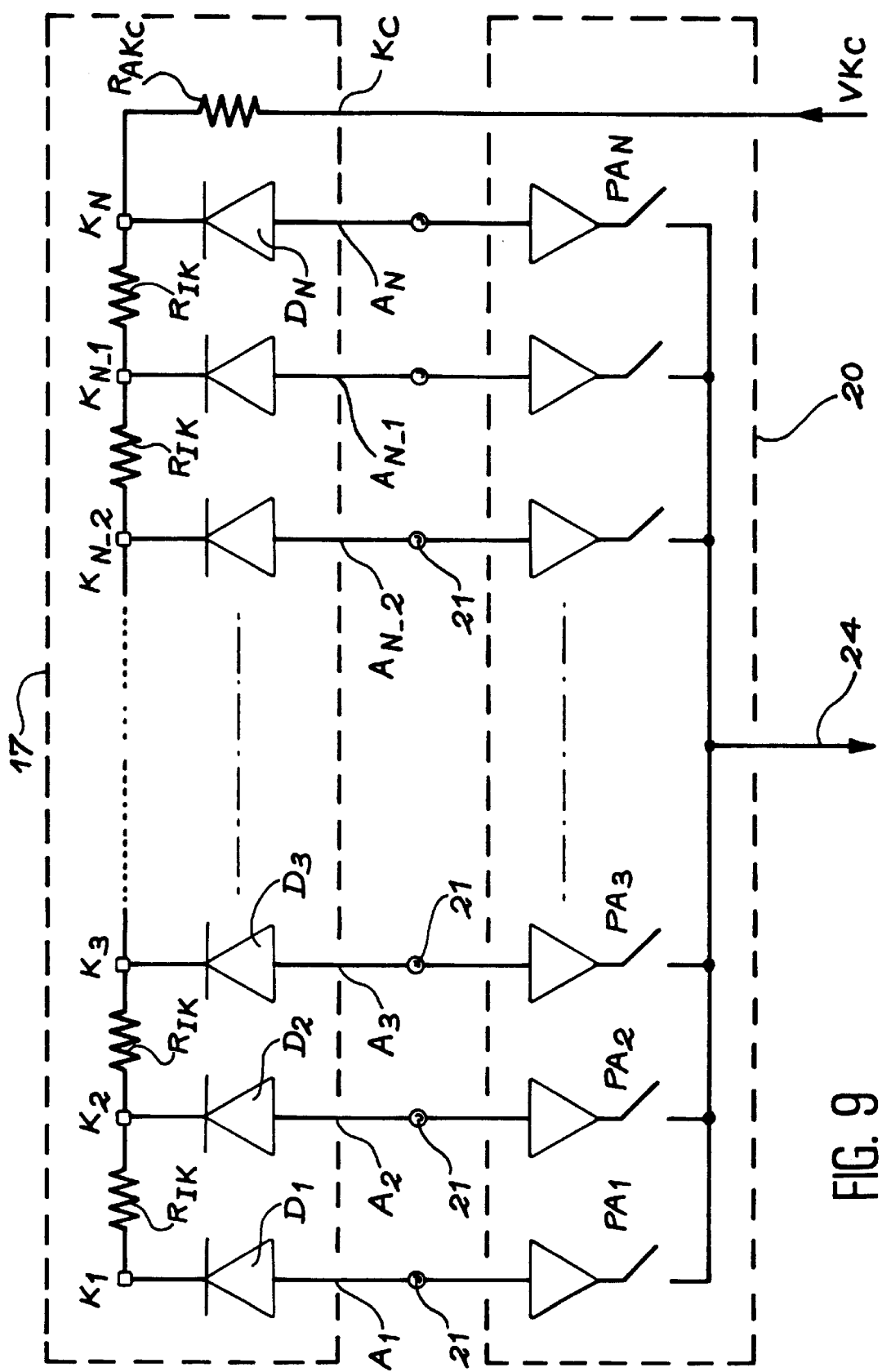
FIG. 9 is an equivalent electric diagram of a sensor.

The essential difference from the prior art circuit represented in the same way in FIG. 6, comes from the absence of ohmic contact 12 in the circuit according to the invention. This ohmic contact 12 is no longer required for cathode voltage as, according to the preferred embodiment, this cathode voltage is controlled by forward biased photodiodes of the detector circuit. However, it will be noted that the preferred embodiment of the invention can be made on a substrate comprising an ohmic contact 12, this contact only being used to comply with a manufacturing protocol before validating a new protocol, or having another use.

Figure 13:
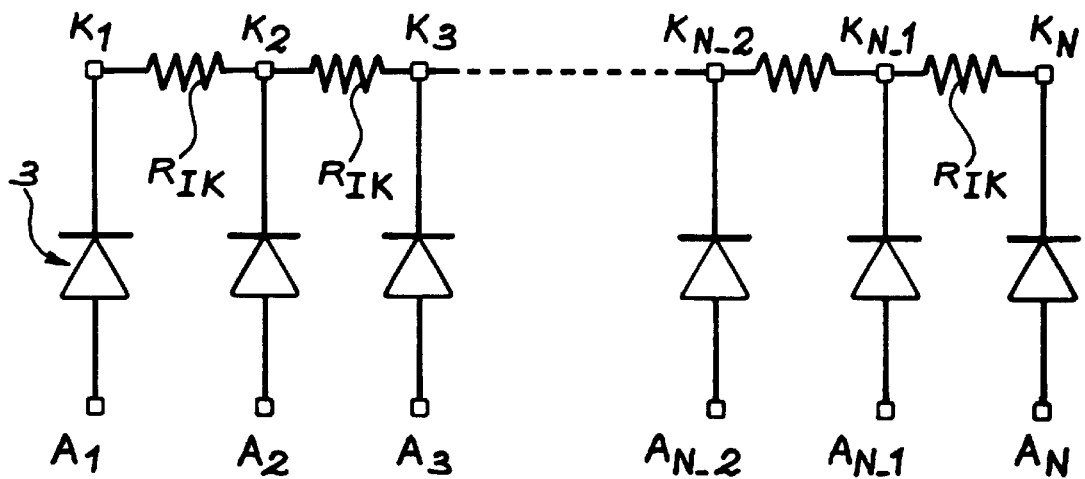
FIG. 13 represents an equivalent electric diagram of the junctions represented in FIG. 12.

The electric diagram of the photodiode row of FIG. 12 is represented in FIG. 13 where the resistor $R_{IK}$ represents the resistance between two associated cathodes. Its value depends on resistivity $\rho_{SC}$ and the semiconductor material thickness, the photodiode spacing and the geometrical junction characteristics (surface, depth).

Figure 14:
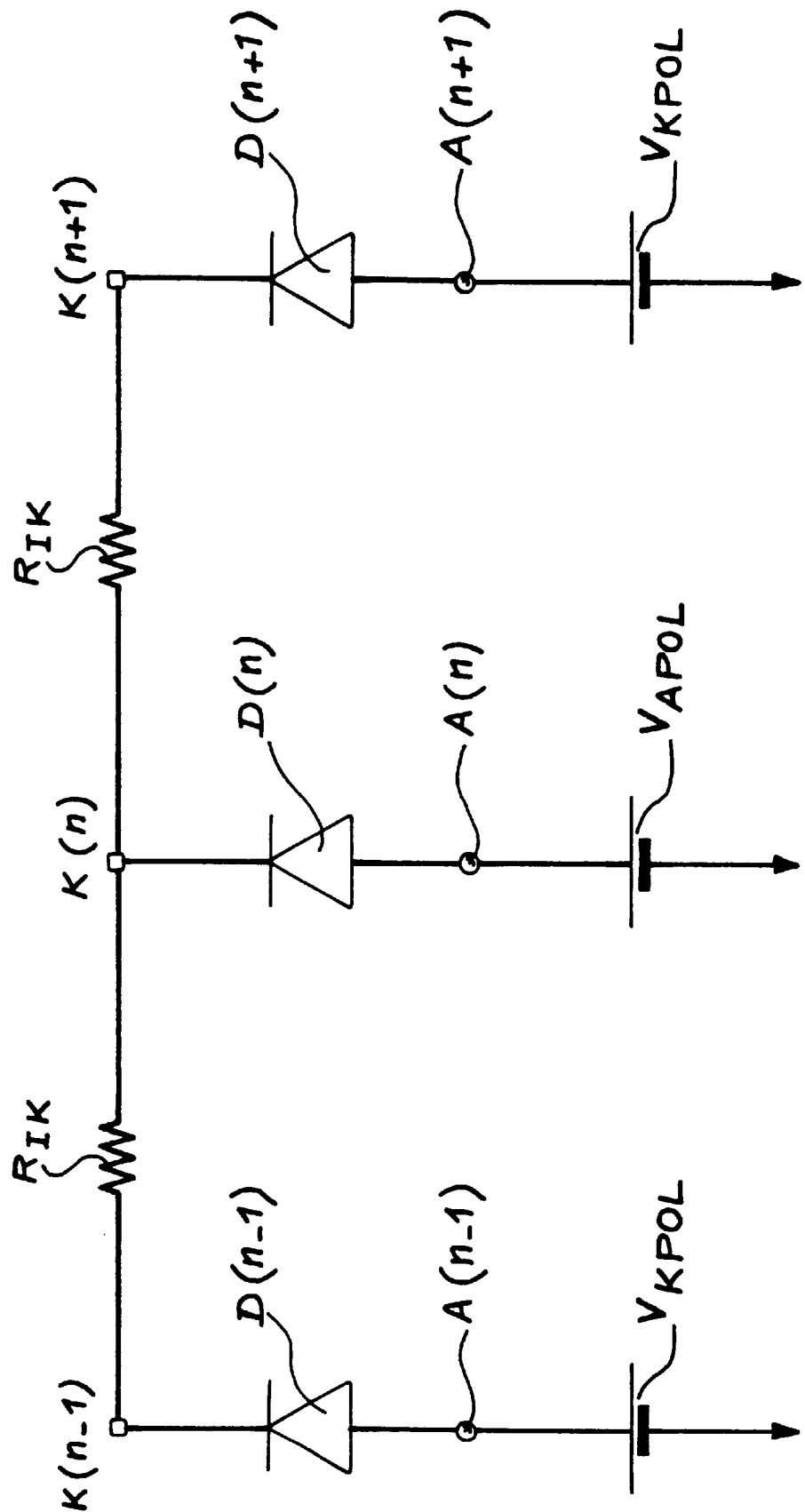
FIG. 14 represents an example of controlling, according to a preferred embodiment, a photodiode through photodiodes associated with this diode.

The cathode of photodiodes 3, represented in FIG. 13, can be controlled by the read circuit. We will consider the three photodiodes, the electric diagram of which is represented in FIG. 14. One voltage source $V_{APOL}$ is applied to the anode A[n] of photodiode D[n], and the voltage source $V_{KPOL}$ to the anode of the associated photodiodes, in the case of this one-dimensional example, photodiodes D[n−1] and D[n+1].

If we assume now that voltage $V_{KPOL}$ is sufficiently positive in comparison with voltage $V_{APOL}$:

photodiodes D[n−1] and D[n+1] are biased in the forward part of their current-voltage characteristic, at the point where they have low dynamic resistance;

photodiode D[n] is biased in the reverse part of its current-voltage characteristic.

For the following explanations, it is assumed, which is generally the case, that the photodiodes have identical or nearly identical current-voltage characteristics and that the substrate is uniform.

Figure 15:
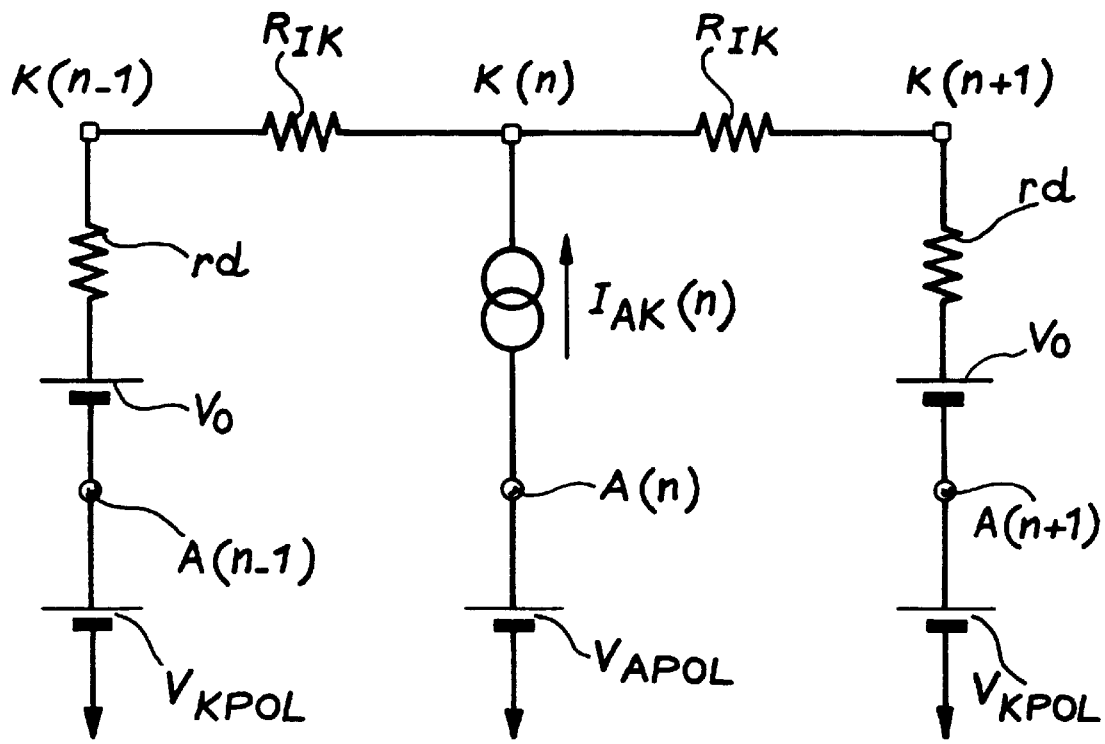
FIG. 15 represents an equivalent electric diagram of the circuit represented in FIG. 14.

Considering the biasing applied to each photodiode, the electric diagram is that of FIG. 15, where:

current generator $I_{AK}[n]$ represents the current output by the reverse biased photodiode D[n];

$r_d$ represents the dynamic resistance of the forward biased associated photodiodes D[n−1] and D[n+1];

$V_O$ is a continuous voltage source representing the potential difference between the anode and the cathode of the photodiodes when they are forward biased and crossed by a fraction, in this case half, of the current $I_{AK}[n]$ output by photodiode D[n].

This diagram clearly shows that by proceeding like this, it is possible to control—i.e. to apply a low impedance voltage to the cathode of photodiode D[n] via its associated photodiodes D[n−1] and D[n+1].

Figure 16:
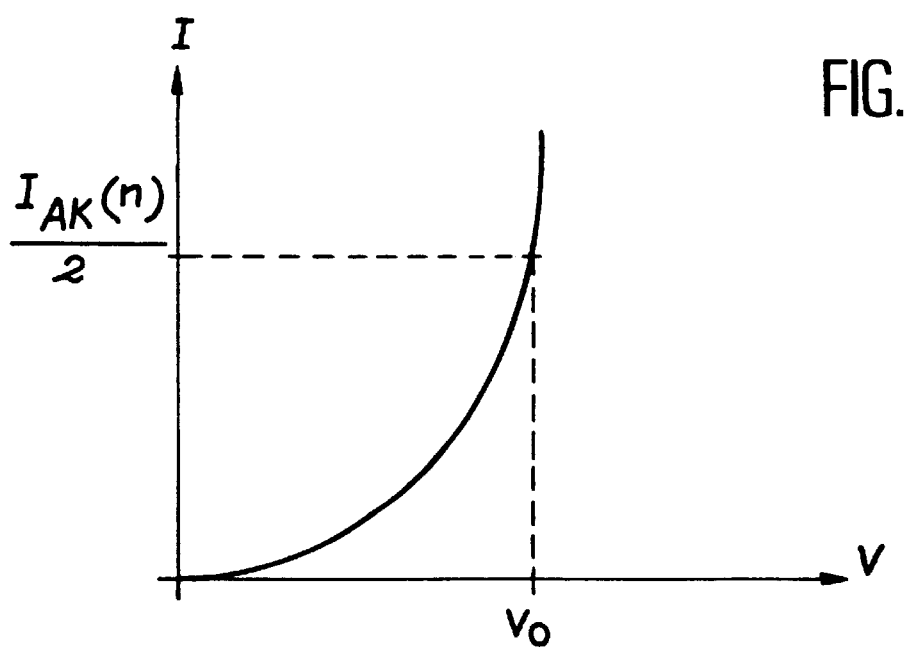
FIG. 16 is a curve showing the current-voltage characteristics of a forward biased photodiode.

The voltage applied to cathode K[n] is given, in a first approximation by the following relation:

$$V_K[n] = V_{KPOL} + V_O$$

where the offset voltage $V_O$ due to the forward biased diodes D[n−1] is D[n+1] is obtained from the current output by photodiode D[n] and the current-voltage characteristic of the associated photodiodes through the graphic method illustrated in FIG. 16.

In the example that has been described, each reverse biased photodiode is surrounded by two forward biased photodiodes, the current output by the reverse biased photodiode being therefore divided in fractions assumed to be equal into each of the biasing diodes.

The number of associated photodiodes used for biasing the cathode of a detector photodiode can be optimized depending on the application envisaged (number of pixels, image format, semiconductor material resistivity, dynamic illumination range).

Some examples of connectivity are represented in FIG. 17: one control photodiode $D_x$ for one detector photodiode $D_r$, in part A two control photodiodes $D_x$ implanted on two parallel sides of detector photodiode $D_r$, in part B.

The configuration represented in part A with a line of control diodes associated with a line of photodetector diodes, can be the same for all the photodiodes of the detector, except for a line located at the border of the detector. The latter possibility depends on the parity of the number of lines, even or odd number of lines, and on the way the line diodes are used alternately as control diodes. In the configuration represented in part B where one line of reverse biased photodiodes is bordered on either side by a line of diodes that are forward biased and provide a cathode voltage transmission function, it is clear that the lines of photodiodes located at the border cannot be biased in the same way as the photodiodes of the center lines.

The same is true for the checkerboard configuration represented in part C where the lines and columns located at the border cannot be biased in the same way as the diodes of the center lines or columns. This results in non-uniformity of the responses from the peripheral diodes in comparison with center diodes.

Non-uniformities of response from the photodiodes implanted at the periphery of a two-dimensional detector circuit can be compensated by implanting control photodiodes so that the limit conditions are the same for the peripheral detector photodiodes and those implanted in the middle of the detector circuit.

An example of biasing sequencing the photodiodes of a two-dimensional sensor will now be described with reference to FIG. 18. In this example, the formation of the pixels of the complete image is done in two successive image sensing operations:

1. voltage $V_{KPOL}$ is applied to the anodes of the odd-numbered column photodiodes between times $T_1$ an $T_4$ (line 1) in order to adequately bias the cathodes of the even-numbered column photodiodes, the anodes of these photodiodes being biased at voltage $V_{APOL}$ by their preamplifiers. The currents output by the even-numbered column photodiodes are injected (line 2) into their preamplifiers between times $T_2$ and $T_3$ (e.g., current-voltage conversion). The information representative of even-numbered column pixels can be stored at the preamplifier of the read circuit (e.g., sample-lock) starting at time $T_3$;

2. voltage $V_{KPOL}$ is applied to the anodes of the even-numbered column photodiodes between times $T_5$ an $T_8$ (line 3) in order to adequately bias the cathodes of the odd-numbered column photodiodes, the anodes of these photodiodes being biased at voltage $V_{APOL}$ by their preamplifiers. The currents output by the odd-numbered column photodiodes are injected into their preamplifiers between times $T_6$ and $T_7$ (line 4) (e.g., current-voltage conversion). The information representative of odd-numbered column pixels can be stored at the preamplifier of the read circuit (e.g., sample-lock) starting at time $T_7$.

3. multiplexing the information stored on the read circuit to the video output stage is done between times $T_9$ and $T_{10}$ (line 5).

This example shows that the invention allows the photodiodes of a two-dimensional detector circuit to be biased by alternatively using each photodiode as a detector device then as a device for controlling its associated photodiode(s).

The biasing sequencing for image sensing a complete image, that has been described, corresponds to the case represented in FIG. 17 part B, where even-numbered line or column photodiodes are used alternatively as photodiodes or control diodes. Information multiplexing allows the complete image to be restored.

In the case where photodiodes that are used alternatively as photodiodes or control diodes are the diodes located on the white squares of a checkerboard and those located on the black squares as represented in FIG. 17 part C, a complete image is composed with half of the available photodiodes.

The material way of realizing the switching of each diode for forward biasing it at anode voltage $V_{KPOL}$ or reverse biasing it at anode voltage $V_{APOL}$ will now be explained with reference to FIGS. 19 and 20.

Figure 19:
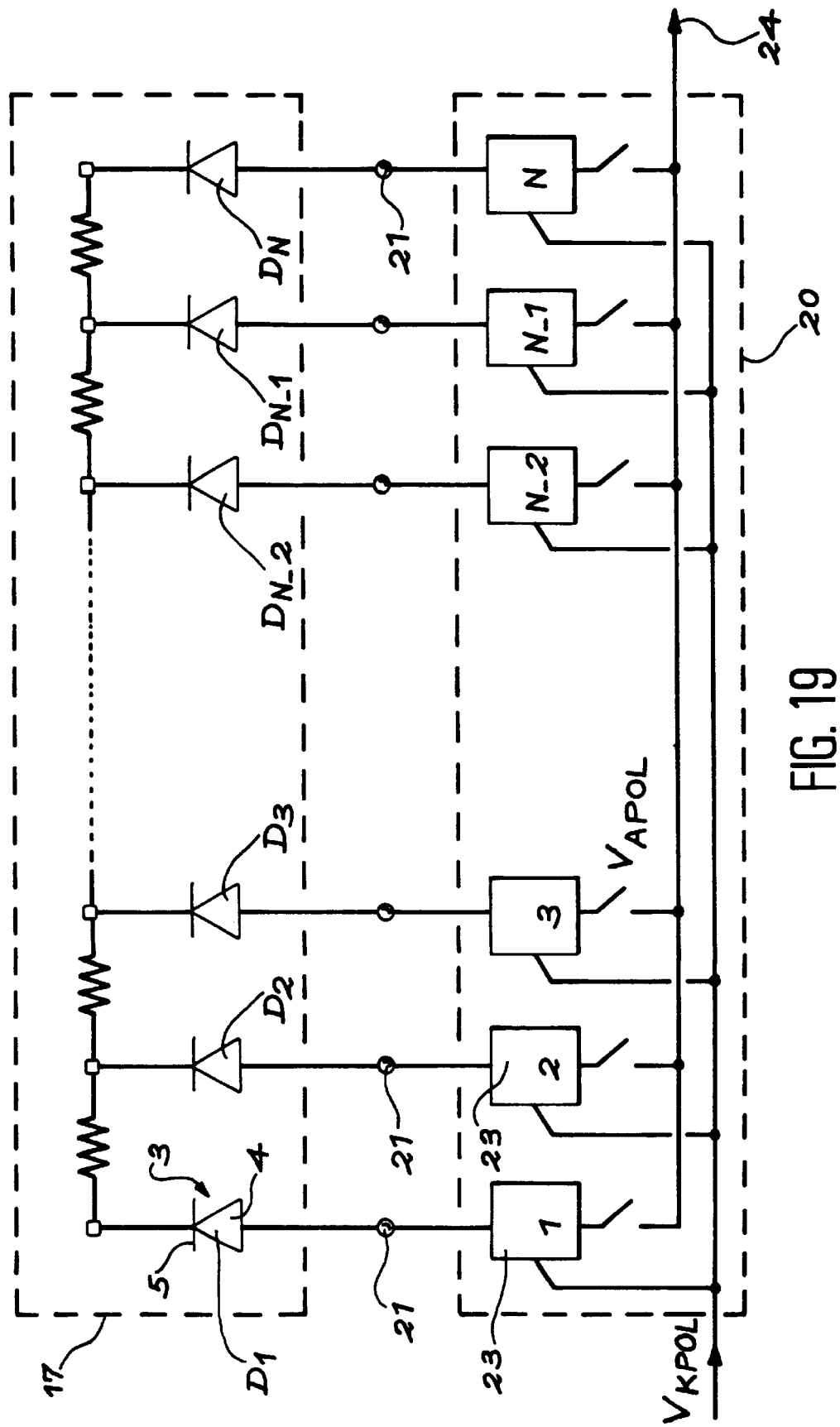
FIG. 19 represents a schematic diagram of an infrared sensor produced according to the invention.

FIG. 19 represents a schematic electric diagram of a matrix sensor operating in the infrared spectral range.

Detector circuit photodiodes 3 are $N^+$ junctions produced on a P-type HgCdTe epitaxy on a CdTe insulating substrate. The anodes 4 of the photodiodes 3 of the detector circuit 17 are interconnected through microspheres 21 to the analog circuits implanted on the read circuit 20 under each photodiode. Each of these photodiodes 3 composes an elementary point of the sensor detector circuit 17. An elementary point of the read circuit PEL composed of a load preamplifier 23 is mapped one-to-one thereto.

The load preamplifier 23 composing each PEL 23 provides in a known way the conversion of the current output by each photodiode 3 into a voltage that will be multiplexed to a video output 24.

Figure 20:
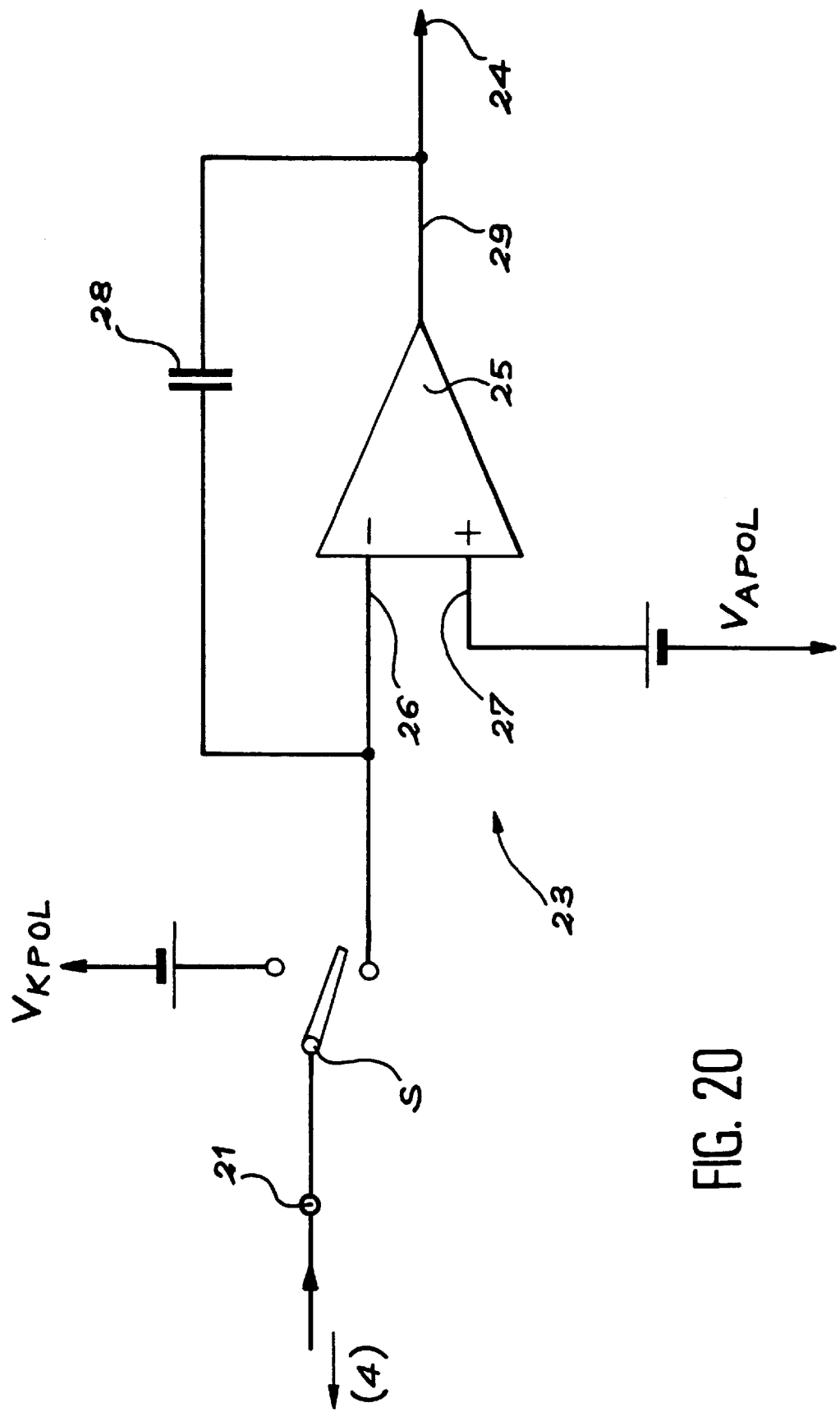
FIG. 20 represents, an electronic diagram of an elementary point of the read circuit of a sensor as represented in FIG. 19.

The schematic electric diagram of the electronics implanted in PEL 23 is given in FIG. 20. The load preamplifier 23 is produced by means of a voltage amplifier 25 with differential inputs 26, 27. A capacitor 28 is implanted with negative feedback between its output 29 and its reversing input 26. Its differential input 27 is a virtual ground: the input voltage of its reversing input 26 is equal to the voltage applied to its non-reversing input 27. The voltage source $V_{APOL}$ corresponding to the reverse biasing of the diode is applied in a known way to the non-reversing input 27.

According to the invention, a switch S allows the photodiode anode to be switched:

to the reversing input, which is the same as applying voltage $V_{APOL}$ thereto, to the voltage source $V_{KPOL}$ forward biasing the photodiode.

Figure 18:
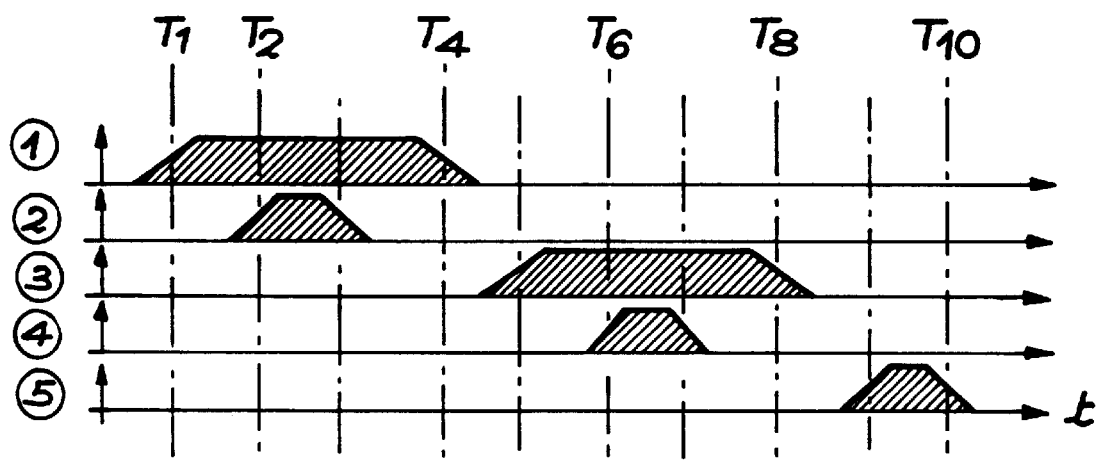
FIG. 18 is an operating time chart of a two-dimensional sensor produced according to the preferred embodiment of the invention.

This sensor operates according to the sequencing presented with reference to FIG. 18. The image sensing of the even-numbered (respectively, odd-numbered) columns is done by terminating the switches S of the odd-numbered (respectively, even-numbered) columns at $V_{KPOL}$ while the switches S of the even-numbered (respectively, odd-numbered) columns terminate at the reversing inputs 26 of amplifier 25. At the end of the image sensing, the information is stored by opening switch S of the even-numbered (respectively, odd-numbered) columns.

The information stored in each PEL 23 is multiplexed in a known way to output 24 when the image sensing of the even-numbered columns and that of the odd-numbered columns is completed. Thus, all the pixels of an image frame are obtained.

BACK TO THE ADVANTAGES OF THE INVENTION

After the description of the invention, the reader will now be able to better understand the advantages of the invention briefly presented above and which are recalled below.

Biasing Point Independent of Photodiode Position

The current output by each detector photodiode terminates at a power supply through the forward biased associated photodiodes. The potential difference across each detector photodiode is independent of its position on the detector circuit.

Therefore, the invention allows the cathode of each photodiode to be biased without space variations.

Thus, it is possible, when the optimal biasing range of the photodiodes is narrow, to bias a maximum of photodiodes within this range, resulting in an increase in the rate of high-performance photodiodes and consequently an improvement of image quality.

Overillumination Hardening

In case of high intensity overillumination on a limited area of the detector circuit, the currents output by the overilluminated detector photodiodes terminate via their associated control diodes. The cathode voltage of the detector photodiodes located outside the overilluminated area is therefore not disturbed by the flow of the photocurrents induced by overillumination.

The invention therefore limits the electric effects induced by local overillumination to the overilluminated area.

The number of pixels disturbed by localized blinding is thus reduced to a minimum.

Maximization of the Detector Circuit's Filling Factor

The invention allows to implant photodiodes on the whole detector circuit, up to the border of the scribing path.

It is thus possible, with a given number of pixels, to reduce the surface of the detector circuit. Increasing the number of circuits feasible per slice causes an increase of manufacturing efficiency.

Reduction of the Detector Circuit's Overall Size

The invention uses identical junctions as the photodetector and/or control device. The design rules of these junctions allow them to be implanted with minimum spacing that turns out in general to be much less than that between a $N^+$ junction and an ohmic contact on P-type material.

The invention therefore allows to minimize the overall size of the detector circuit.

Consequently, in the case of the hybrid detector circuits reversed on a read circuit, all conditions being the same otherwise, the dimensions of the read circuit are reduced.

Reducing the dimensions of the read circuit has several effects:

reducing the space taken up by the sensor with a given format and spacing increasing the format with given spacing and overall size of the read circuit increasing the manufacturing efficiency of the read circuit with a given spacing and format.

Simplification of the Detector Circuit's Manufacturing Method

The invention allows the photodiode cathodes to be biased without calling upon an ohmic contact on the P-type material. The technological steps required for producing it can therefore be eliminated.

The invention allows to manufacture detector circuits by means of the mere technological steps required for producing photodiodes.

Reducing the number of manufacturing steps has the effect of increasing manufacturing efficiency, and reducing manufacturing time.

APPENDIX

List of References Quoted

[1] Hon-Sam WONG "Technology and Device Sealing Consideration for CMOS Imagers—IEEE transaction on Electron Devices, vol. 43, no. 12, December 1996, pp. 2131–2142.

[2] J. L. TISSOT; F. BERTRAND—Colloque International OPTRONIQUE & DEFENSE, Dec. 3–5, 1996, MONTIGNY LE BRETONNEUX—FRANCE, "Le développement des technologies infrarouges au LIR".

[3] Patent application no. FR 9 504 174 filed Apr. 7, 1995.

What is claimed is:

1. An image sensor comprising:
   a detector circuit composed of a first set of coplanar photodiodes carried by a substrate, each photodiode having an anode and a cathode,
   a read circuit composed of a set of elementary read means, with the detector circuit and the read circuit being interconnected so that each elementary read means is coupled to the anode of a photodiode,
   a means for biasing photodiodes by creating a potential difference between each photodiode anode and cathode,
   the image sensor being characterized in that the substrate of the detector circuit has a second set of diodes that are coplanar and located in the same plane as that of the first set, each diode of the second set having a cathode and an anode, each diode of the second set being associated with at least one photodiode of the first set, in that each anode of the photodiodes of the first set is connected or can be connected through the read circuit to a first voltage source reverse biasing the photodiodes of the first set, and in that each anode of the diodes of the second set is connected or can be connected through the read circuit to a second voltage source forward biasing the diodes of the second set, with the voltage for biasing the photodiodes of the first set thus being controlled by controlling the voltages applied to the anodes of the first and second sets.

2. The image sensor according to claim 1, characterized in that the number of photodiodes, of the first set is equal to the number of diodes of the second set.

3. The image sensor according to claim 1, characterized in that the diodes of the first and second sets are photodiodes, the read circuit comprising means for alternatively connecting the first voltage source to the anodes of the photodiodes of the first set, the second voltage source to the anodes of the diodes of the second set, then to the anodes of the photodiodes of the second and first sets, respectively.

4. The image sensor according to claim 2, characterized in that the diodes of the first and second sets are photodiodes, the read circuit comprising means for alternatively connecting the first voltage source to the anodes of the photodiodes of the first set, the second voltage source to the anodes of the diodes of the second set, then to the anodes of the photodiodes of the second and first sets, respectively.

5. The sensor according to claim 2, characterized in that the elementary means of the read circuit comprises a controllable switch switching a connection between the detector circuit and the read circuit between two positions:
   a position wherein this connection is connected or can be connected to the first voltage source and a position wherein this connection is connected or can be connected to the second voltage source.

6. The image sensor according to claim 1, characterized in that the diodes of the first and second sets are arranged in lines, each diode of the first set being located in alignment with a diode of the second set.

7. A method of biasing coplanar photodiodes of an image sensor detector circuit, the detector circuit having on the same substrate two coplanar photodiode sets, a first one and a second one, each diode of each of the two sets having an anode and a cathode, and one photodiode of the second set being associated with at least one photodiode, of the first set, the method being characterized in that a voltage is applied alternatively and iteratively to the anodes of the photodiodes of the first set, reverse biasing them, while a voltage is applied to the anodes of the photodiodes of the second set, forward biasing them, then a voltage is applied to the photodiodes of the first set, forward biasing them, while a voltage is applied to the anodes of the photodiodes of the second set reverse biasing said photodiodes.

* * * * *